United States Patent [19]

Nakatsu et al.

[11] Patent Number: 4,955,009
[45] Date of Patent: Sep. 4, 1990

[54] OPTICAL DISK DRIVE APPARATUS HAVING COUNTER DISABLE AT SEEK START-UP

[75] Inventors: Keiji Nakatsu; Masaharu Ogawa, both of Amagasaki, Japan

[73] Assignee: Mitsubishi Denki Kabushiki Kaisha, Tokyo, Japan

[21] Appl. No.: 184,985

[22] Filed: Apr. 22, 1988

[30] Foreign Application Priority Data

Apr. 30, 1987 [JP] Japan ................. 62-109330

[51] Int. Cl.⁵ .............................. G11B 19/02
[52] U.S. Cl. ................................... 369/32

[56] References Cited

U.S. PATENT DOCUMENTS

| | | | |
|---|---|---|---|
| 4,390,912 | 6/1983 | Hertrich et al. | 360/78 |
| 4,547,822 | 10/1985 | Brown | 360/78.06 |
| 4,811,316 | 3/1989 | Hosoya | 360/77.3 |

OTHER PUBLICATIONS

SPIE Proceedings, vol. 695, Conference 695, Optical Mass Data Storage II, "Tracxing Servo for Small Size Optical Disk System," Inada et al.

*Primary Examiner*—Donald McElheny, Jr.
*Attorney, Agent, or Firm*—Fleit, Jacobson, Cohn, Price, Holman & Stern

[57] ABSTRACT

In an optical disk drive apparatus for driving an optical disk having tracks for recording information, an optical head focuses a light beam onto a spot on a track on the optical disk, and an actuator moves the optical head, thereby causing the spot of the light beam to move from its current track to a target track in order to access the target track. A track counter counts the tracks moved by the spot of the light beam. The counting of tracks is disabled for an interval at the start of each track access operation to prevent miscounting caused by jitter that occurs when initiating a track access operation.

12 Claims, 6 Drawing Sheets

OPTICAL DISK DRIVE APPARATUS HAVING COUNTER DISABLE AT SEEK START-UP

BACKGROUND OF THE INVENTION

This invention relates to an optical disk drive apparatus with high-speed access performance.

Optical disks have recently come into use as data storage media in computer systems, and disk drive apparatus has been developed for reading and writing such disks. A block diagram of the control system of an optical disk drive apparatus similar to that described in Japanese Patent Application Laid open No.156526/1986 is shown in FIG. 6. In this apparatus, information is written on or read from concentric circular or spiral tracks on an optical disk 1, shown here in cross section. The information is conveyed to or from the optical disk by a light beam 2 produced by an optical head 3. The light beam 2 is focused by a lens onto a spot on the optical disk 1. The optical head 3 is mounted on a carriage 4 which can be driven by a linear actuator 5 to move the spot of the light beam 2 from one track to another. When the spot is following a track, a tracking actuator 6 turns the lens to keep the spot positioned at the center of the track. A tracking sensor 7, comprising a pair of photosensitive elements, senses the light reflected from the disk surface. The electronics of the apparatus comprise a difference amplifier 11 and summing amplifier 12 that process the signals from the photosensitive elements, a speed detection circuit 13 and direction detection circuit 14 that detect the motion of the spot, a spot velocity detection circuit 15, a pulse generator circuit 16 that generates one pulse for each track crossed by the spot, a track counter 17 that counts these pulses, a reference velocity generating circuit 19, a velocity error detection circuit 21, an amplifier circuit 22, a tracking command circuit 25, and a tracking servo circuit 26. The operation of the control system is described next.

The control system operates in two modes: a track following mode, the purpose of which is to keep the spot of the light beam 2 centered on the current track; and a track access mode, the purpose of which is to move the light beam 2 from the current track to a target track. Normally the control system stays in the track following mode. A transition to the access mode occurs when a command circuit 90 supplies an access command to move to a new target track. The target track is specified by two input signals: a stroke count input (N) indicating the number of tracks the spot of the light beam 2 must move to get from the current track to the target track; and a direction input (D) indicating whether the light beam 2 must move toward the center or the periphery of the disk. The stroke count input is received by the track counter 17 and presets the track counter 17 to the value of N. The output of the track counter 17 is sent to the reference speed generating circuit 18. When the reference speed generating circuit 18 receives the access start command S14 and the initial count signal N, it generates and stores a reference speed pattern indicating how the speed to the spot should vary during the access operation. It supplies the reference velocity generating circuit 19 with a speed signal of this pattern which varies with the count value from the track counter 17 indicating the diminishing number of remaining tracks.

The reference velocity generating circuit 19 receives in addition to the reference speed signal, the direction input D indicating the direction in which the light beam 2 should move. The reference velocity generating circuit 19 combines this speed and direction information into a reference velocity signal, which it sends to the velocity error detection circuit 21. The velocity error detection circuit 21 compares the reference velocity with the current velocity of the spot and generates a velocity error signal. The amplifier circuit 22 amplifies this velocity error signal and controls the linear actuator 5 in such a ay as to reduce the velocity error to zero. The linear actuator thus drives the carriage 4 so that the spot of the light beam 2 is forced to move toward the target track at a velocity matching the reference velocity.

As the spot of the light beam 2 crosses the tracks, the intensity of the reflected light varies. The pair of photosensitive elements in the tracking sensor 7 receives the reflected light and converts it to a pair electrical signals that vary cyclically, due to variation in the reflected light, with a frequency proportional to the speed of the spot. Due to the placement of the photosensitive elements, these electrical signals are out of phase with each other, but are equal when the spot is either centered on a track or located at the midpoint between two tracks.

The electrical signals from the tracking sensor 7 are sent to the difference amplifier 11 and the summing amplifier 12, which obtain their difference and sum respectively. The speed detection circuit 13 receives the output from difference amplifier 11 and detects from its frequency the speed of the spot. The direction detection circuit receives he outputs from both the difference amplifier 11 and summing amplifier 12 and detects from their phase relationship the direction of motion of the spot. The spot velocity detection circuit 15 receives a speed signal from the speed detection circuit 13 and a direction signal from the direction detection circuit 14 and combines them into a signal indicating the current velocity with which the spot is moving on the optical disk 1. This signal is sent to the velocity error detection circuit 21, Which compares it with the reference velocity signal from the reference velocity generating circuit 19. The result is amplified by the amplifier circuit 22 and controls the linear actuator as described earlier, causing the light beam 2 to move toward the target track at the velocity specified by the reference velocity signal.

The output from the difference amplifier 11 is also sent to the pulse generator circuit 16. This output varies cyclically above and below zero with the zero point occurring when the light beam is centered on a track or at the midpoint between two tracks. The pulse generator circuit 16 generates a pulse that is High hen the difference signal is negative and Low when the difference signal is positive. One pulse is thus generated per complete cycle of the difference signal, hence there is one pulse per track crossed by the spot of the light beam 2. The track counter 17 receives these pulses and decrements by one count for each pulse received. Since the initial count is the stroke count N, at any given point during the access operation the count output by the track counter 17 indicates the number (OA) of remaining tracks the spot of the light beam 2 has to go to reach the target track. As it receives the diminishing counts from the track counter, the reference speed generating circuit 18 sends the corresponding reference speed signals from its stored pattern to the reference velocity generating circuit 19. The spot thus moves according to the pattern, first accelerating, then traveling at a steady speed, then decelerating as it approaches the target track.

The tracking command circuit 25 receives the count output OA from the track counter 17 and the speed signal from the speed detection circuit 13. When it receives a zero count signal, indicating that the spot is on or almost on the target track, it waits for the spot speed to be reduced to a sufficiently low level, then commands the tracking servo circuit 26 to begin driving the tracking actuator 6. This marks the return from the track access mode to the track following mode. In the track following mode the tracking servo circuit 26, activated by the tracking command from the tracking command circuit 25, monitors the difference output signal from the difference amplifier 11 and controls the tracking actuator 6 so as to reduce the difference to zero; that is, to move the beam spot to the center of the track and hold it there. Information is then written or read as the light beam 2 follows the target track.

FIG. 7 illustrates an output S1 from the difference amplifier 11, the resulting pulse output S2 from the pulse generator circuit 16, and the count output OA from the track counter 17 When the control system operates correctly. The count signal OA rises from O to N when the access command is received, then decrements in steps of one count per track as the spot moves toward the target track.

FIG. 8 illustrates a problem that tends to occur in optical disk drive control systems like the one just described, the problem being fluctuations that tend to occur around the zero level due for example to an external vibration or other disturbance. These fluctuations are particularly problematical because the light beam moves slowly immediately after the start of access. The fluctations lead to pulse jitter in the output S2 of the pulse generator circuit. As a result, the track counter miscounts the number of tracks and the light beam 2 fails to reach the target track. The access operation must then be repeated until the target track is reached successfully. Such repetitions retard the access performance of the optical disk drive apparatus.

SUMMARY OF THE INVENTION

The present invention is directed toward an optical disk drive apparatus employing a track counter in the control of track access operations. A particular feature of this invention is that pulse input to the track counter is disabled at the start of the track access operation, hereby masking pulse jitter, reducing miscounts, and speeding up access performance.

DETAILED DESCRIPTION OF THE PREFERRED EMBODIMENTS

Figure 1:
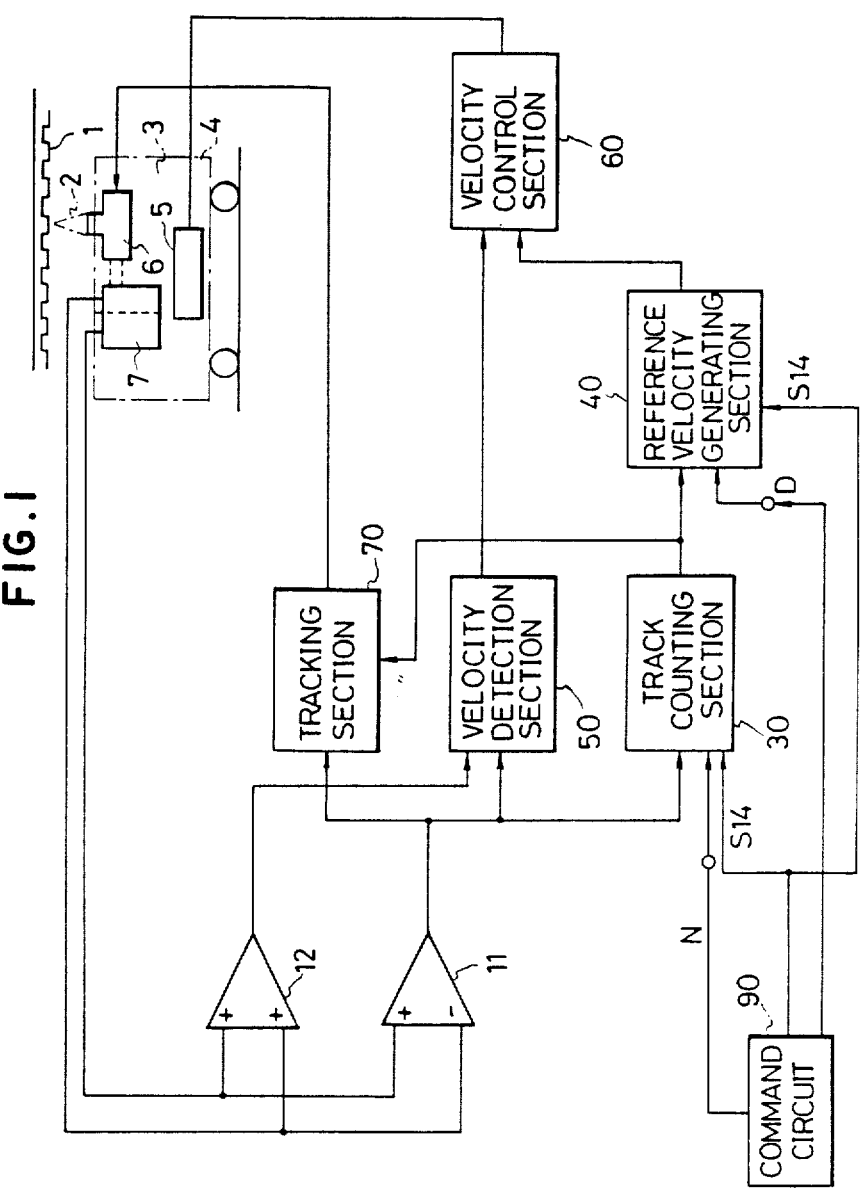
FIG. 1 is a block diagram of the optical disk drive control system of the present invention.
Figure 2:
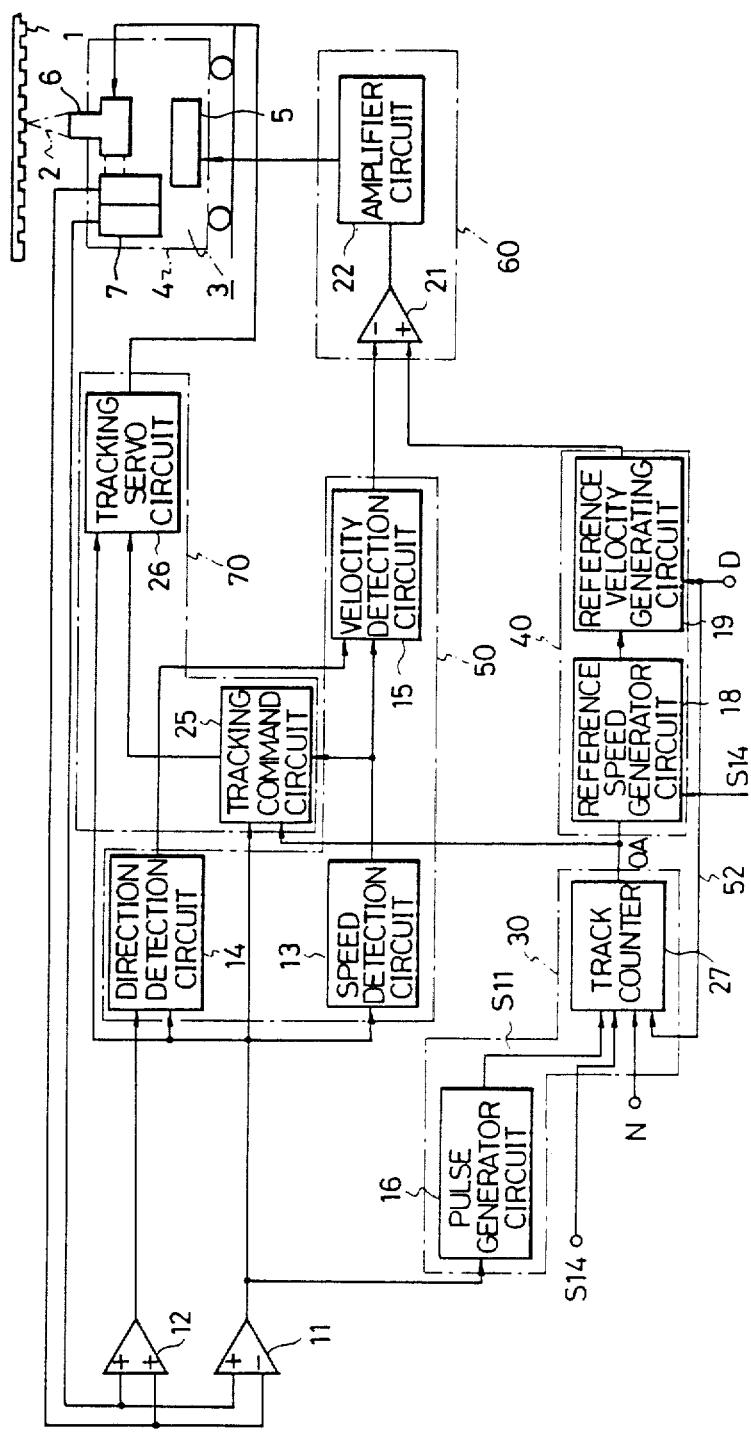
FIG. 2 is a more detailed block diagram of the same.
Figure 3:
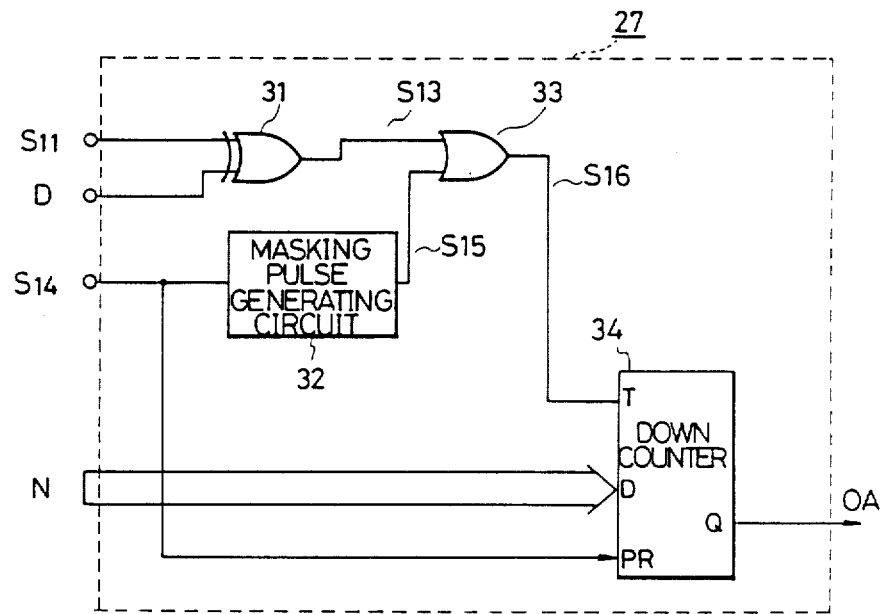
FIG. 3 is a detailed schematic diagram of the track counter circuit in FIG. 2.
Figure 6:
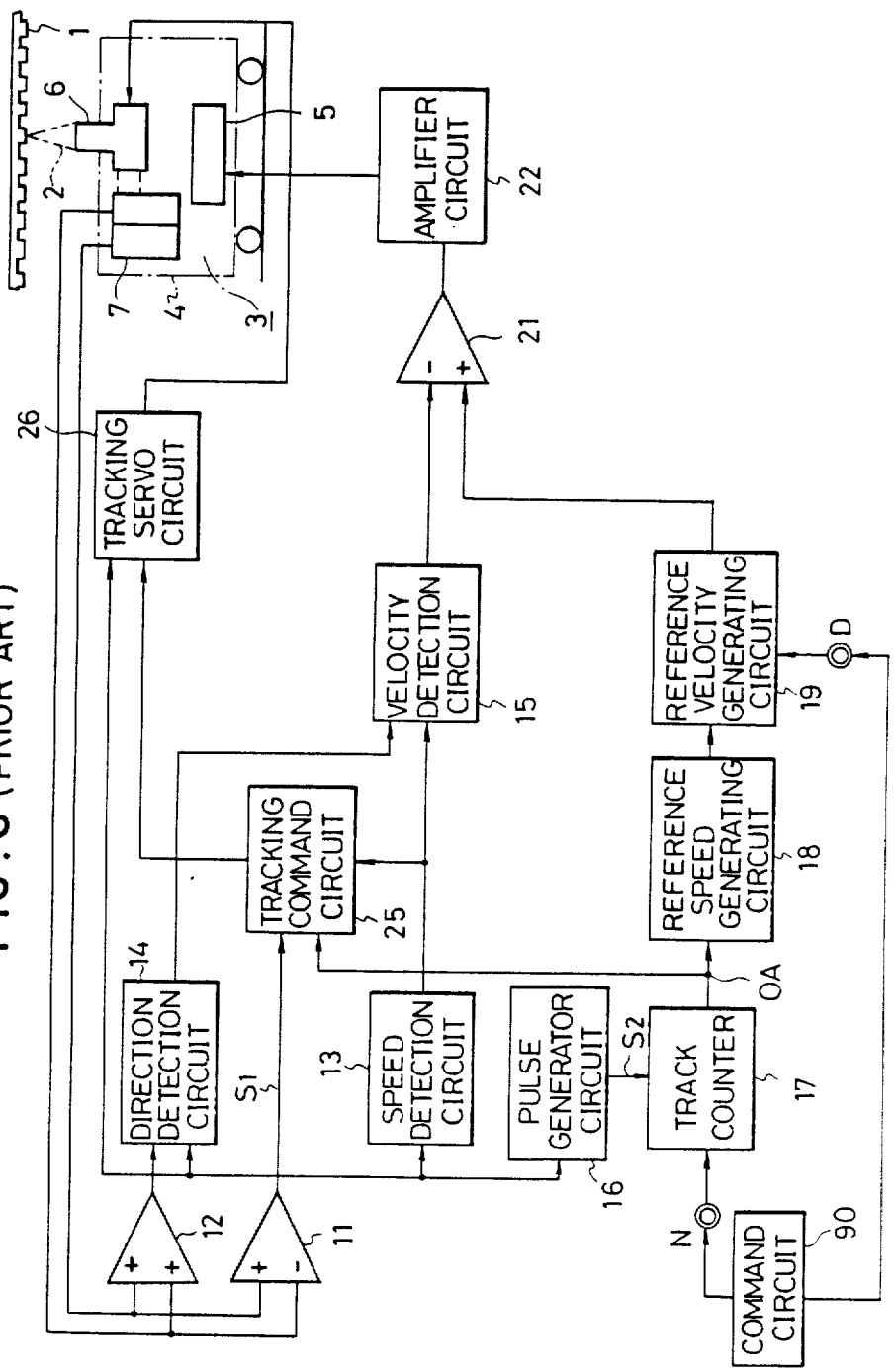
FIG. 6 is a block diagram illustrating the prior art.
Figure 7:
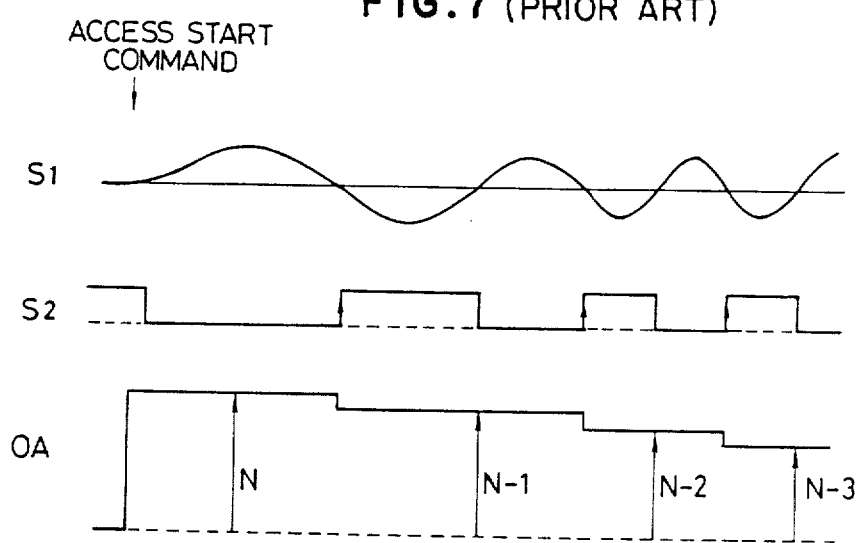
FIG. 7 and FIG. 8 illustrate signal waveforms of the difference amplifier, pulse generator circuit, and track counter in FIG. 6.
Figure 8:
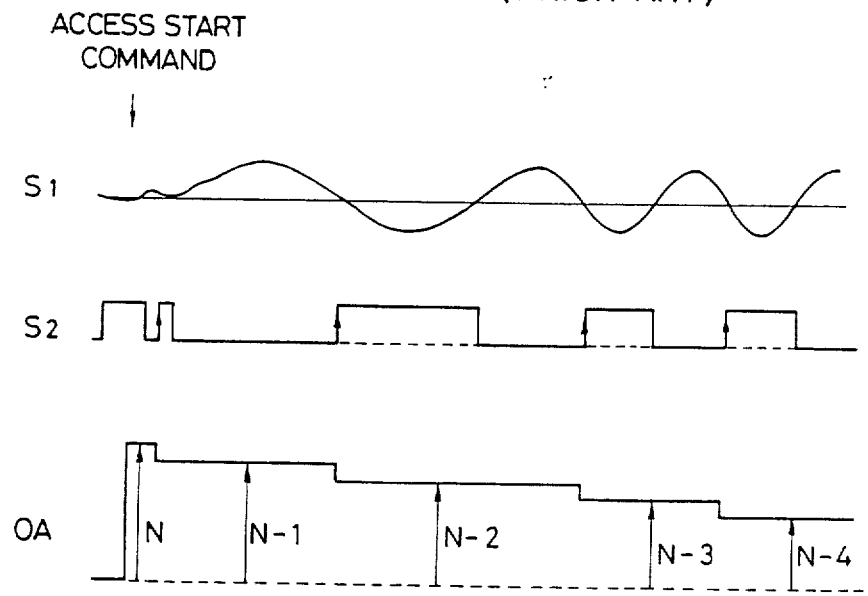

FIG. 1, FIG. 2, and FIG. 3 illustrate a preferred embodiment of this invention at three levels of detail. The elements numbered 1 through 7, 11 through 16, 18, 19, 21, 22, 25, and 26 in these drawings are identical to the corresponding elements of the prior art as shown in FIG. 6, so further descriptions of these elements are omitted.

FIG. 1 shows the main circuit blocks of the control system of this invention, which are: a track counting section 30 that keeps count of the number of tracks remaining to the target track; a reference velocity generating section 40 that generates a reference velocity signal; a velocity detection section 50 that detects the current velocity of the spot of the light beam 2; a velocity control section 60 that controls the linear actuator 5 to make the velocity of the spot match the reference velocity; a tracking section 70 that makes the spot follow the center of the current track; and a command circuit 90 that supplies information on the number (N) of tracks to be moved to the target track, the direction (D) of the movement and an access start signal S14.

FIG. 2 presents a more detailed block diagram of the control system. It can be seen that the track counting section 30 comprises a pulse generator circuit 16 and a track counter 27, the reference velocity generating section 40 comprises a reference speed generating circuit 18 and a reference velocity generating circuit 19, the velocity detection section 50 comprises a speed detection circuit 13, a direction detection circuit 14, and a spot velocity detection circuit 15, and the velocity control section 60 comprises a velocity error detection circuit 21 and an amplifier circuit 22. Except for the track counter 27, these component circuits are identical to those in FIG. 6. Their inputs and outputs are also the same as in FIG. 6, except that the track counter 27 now has four inputs: a pulse signal S11 from the pulse generator circuit 16; an access command S14, a stroke count N, and a direction input D which is the same as D in FIG. 6. As in FIG. 6, the stroke count N indicates the number of tracks from the current track to the target track, and the direction input D indicates the direction in which the target track lies from the current track.

The track counter 27 is shown in greater detail in FIG. 3. It comprises: an exclusive logical OR gate 31 that receives the pulse signal S11 from the pulse generator circuit 16 and the direction input D and generates their exclusive logical OR; a masking pulse generating circuit 32 that receives the access command S14 and generates a masking pulse of a fixed duration; a logical OR gate 33 that receives the outputs of the exclusive logical OR gate 31 and the masking pulse generating circuit 32 and generates pulses representing their logical OR; and a downcounter 34 that receives the access command, the stroke count N, and the pulses output from the logical OR gate 33, presets to the value N on the access command, decrements by one for each pulse received, and outputs the result as the remaining track count OA.

Figure 4:
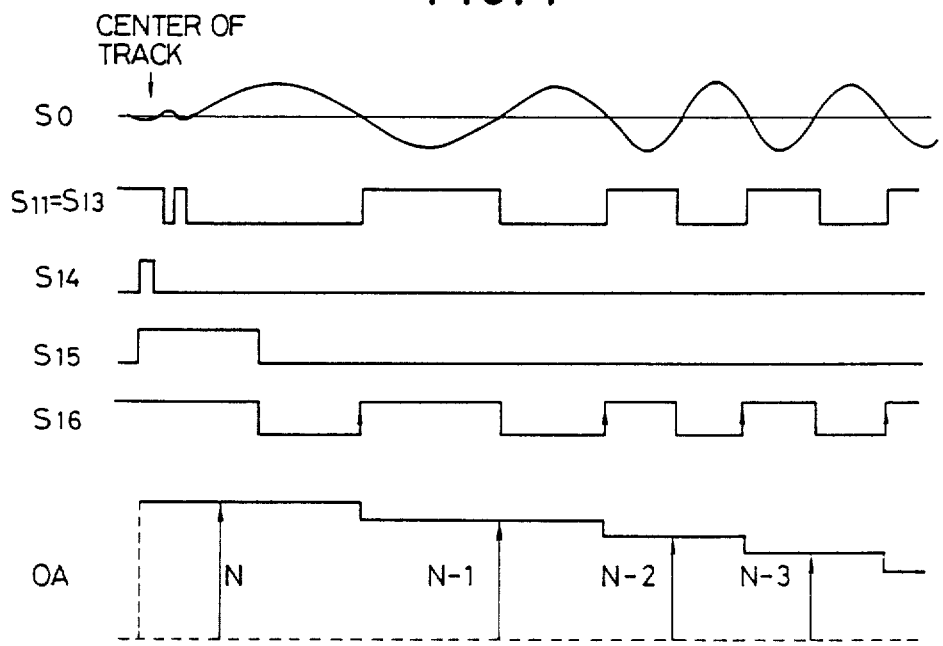
FIG. 4 illustrates signal waveforms in the track counter circuit when the access is in the direction such that the direction input S2 is Low.
Figure 5:
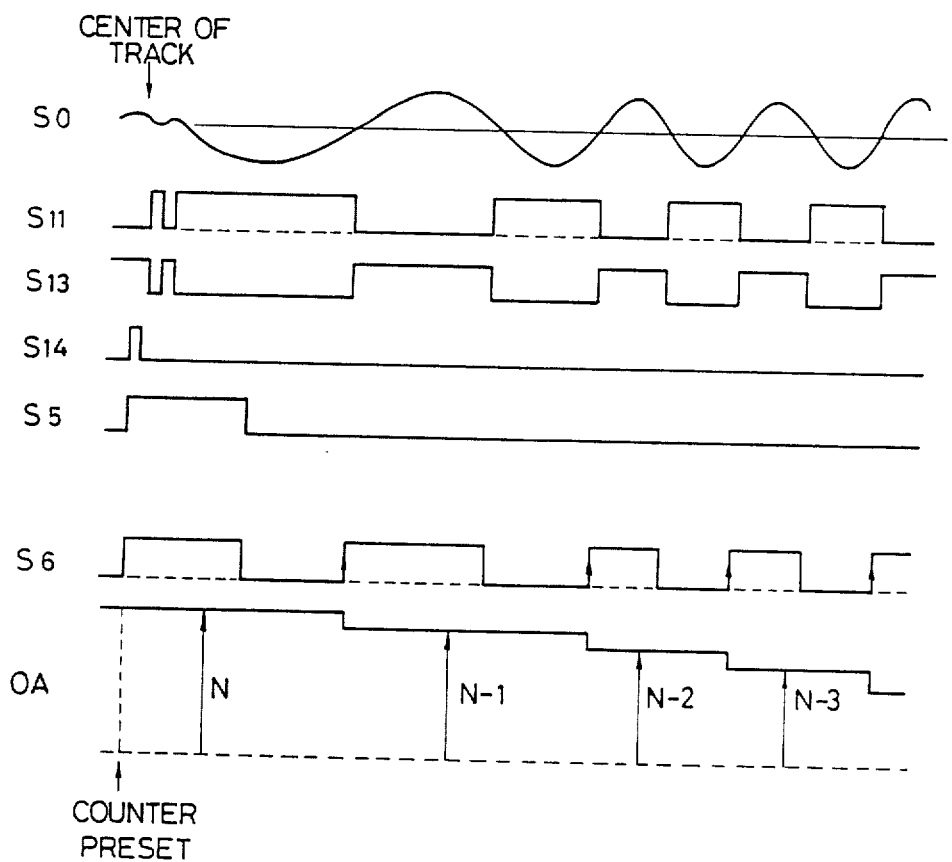
FIG. 5 illustrates the same signal waveforms when the access is in the opposite direction.

The operation of this embodiment will be explained with reference to FIG. 1, FIG. 3, FIG. 4, and FIG. 5. FIG. 4 illustrates waveforms of the signals in the track counting section 30 when the direction input D is Low; FIG. 5 illustrates waveforms of the signals in the track counting section 30 hen the direction input D is High.

A track access operation begins when a track access command S14 accompanied by a stroke count N and direction input D is produced. The access command S14 causes the down-counter 34 in FIG. 3 to preset to the value of N. The access command S14 also triggers the masking pulse generating circuit 32, which begins output of a masking pulse. This masking pulse is applied to the OR gate 33 and causes its output S16 to be High regardless of any pulses received from the pulse generator circuit 16 via the XOR gate 31.

During the initial period of the output S16 from the OR gate 33, the down-counter 34 produces as its output the preset value N. This value N is sent as the remaining track count OA from the track counting section 30 to the reference velocity generating section 40, which is also in receipt of the access command S14, and generates and stores a reference speed pattern predefined for the stroke count N and begins output of a reference velocity signal to the velocity control section 60. The velocity control section 60 drives the linear actuator 5 so as to move the light beam 2 toward the target track at the reference velocity. Reflection from the spot of the light beam 2 on the optical disk 1 is detected by a pair of photosensitive elements in the tracking sensor 7, the outputs of which are fed to the difference amplifier 11 and the summing amplifier 12. From the outputs of the difference and summing amplifiers, the velocity detection section 50 detects the velocity of the spot and reports it to the velocity control section 60, so that the spot velocity can be corrected to match the reference velocity. Details of these operations are as already described in connection with FIG. 6. The following paragraphs focus on the subsequent operation of the track counting section 30.

The access operation starts with the spot positioned near the center of the current track, in which position the input S0 to the pulse generator circuit 16 in the track counting section 30 is approximately zero. As the spot begins moving near the center of the current track, the signal S0 fluctuates around zero. Such fluctuations may give rise to jitter in the output S1 from the pluse generator circuit 16, as shown in FIG. 4 and FIG. 5, but the jitter is masked by the masking pulse S5 and does not cause the track counting section 30 to miscount tracks.

The fixed duration of the masking pulse S15 should be longer than the time taken for the spot to move from any point (at which the spot may be situated in the track following mode operation) out of the region (in which the signal S11 is near zero) near the center of the track even if the slowest reference speed pattern is employed. The fixed duration of the masking pulse S15 should also be shorter than the time taken for the spot to move from the starting track halfway to the next track even if the fastest reference speed pattern is employed. Accordingly, by the time the input S0 to the pulse generator circuit 16 returns to zero at the midpoint between the two tracks, the output of the pulse generator circuit 16 is no longer masked.

The polarity of the input S0 to the pulse generator circuit 16 depends on the direction of the access operation. In FIG. 4, after the initial fluctuations, S0 begins moving in the positive direction. In FIG. 5 the access is in the opposite direction and the outputs from the photosensitive elements in the tracking sensor 7 have the opposite phase relation, so the signal S0 has the opposite sign and begins moving in the negative direction. This causes the pulse signal S11 from the pulse generator circuit 16 to be Low in FIG. 4 where it is High in FIG. 5 and vice versa. The pulse signal S11 is, however, XORed in the XOR gate 31 with the direction input D, which is Low in FIG. 4 and High in FIG. 5. From the logic relations:

P XOR Low = P and

P XOR High = not − P (where P is any signal), it follows that the output S13 of the XOR gate 31 has the same polarity in both FIG. 4 and FIG. 5.

The signal S13 thus rises when the spot of the light beam 2 crosses the midpoint between two tracks, regardless of the direction of access. At each rise of the signal S13 the down-counter 34 decrements the remaining track count OA by one. Applied to the reference velocity generating section 40 as the signal OA, these remaining track counts cause successive output of the speed signals from the reference speed pattern, resulting in the desired motion of the spot toward the target track.

When the spot crosses the last midpoint before the target track, the remaining track count falls to zero. At this track count the reference velocity generating section generates a zero velocity signal, so the velocity control section 60 causes the linear actuator 5 to bring the carriage 4 of the optical head 3 to a stop. The zero remaining track count also causes the tracking section 70 to begin driving the tracking actuator 6 to move the spot into the center of the target track and hold it there, as already described in relation to FIG. 6. Information is then written or read in the track-following mode.

As compared with the prior art, the likelihood of failing to reach the target track due to track miscounting is reduced due to the masking of pulse jitter at the start of the access operation. Access performance is improved accordingly. The act that track counting and speed control are carried out in the same way in either direction of access, due to the XOR gate in the track counting section, also contributes to good access performance.

Various alterations can be made in the embodiment just described without departing from the scope of this invention. For example, the track counting section 30 could receive the output from the summing amplifier 12 instead of the output from the difference amplifier 11. Alternatively, in a sample servo system using an optical disk without track grooves, the track counting section 30 could receive a tracking singal output from an off-track detector, an output from a track-crossing detector, or any anyother signal that varies cyclically as the spot of the light beam 2 moves from track to track. The track counting section 30 could also be configured to decrement the remaining track count as the spot crossed the center of each track, or at some other point, instead of at the midpoint between tracks.

The track counting circuit could employ an up-counter instead of a down-counter. It must then receive, instead of the stroke count N, a negative value representing the complement of the stroke count.

The reference speed generating circuit 18 can be so arranged as to detect the change in the output of the track counting section from 0 to any other value and to recognize, on the basis of such change, that the access initiation command has been produced. In such a case, the access initiation command S14 need to be supplied to the reference speed generating circuit.

Instead of a linear actuator, a rotary actuator or any type of actuator capable of moving the optical head could be used. Furthermore, it is not necessary for the actuator to be mounted on the carriage as shown in the drawings; the actuator could be mounted separately, thereby reducing the mass to be moved.

What is claimed is:

1. An optical disk drive apparatus for driving an optical disk having tracks for recording information, comprising:

an optical head for focusing a light beam onto a spot on a track on the optical disk;

an actuator for moving the optical head, thereby causing the spot of the light beam to move from its current track to a target track in order to access the target track;

command means providing information on the number of tracks to be moved for the access to a target track;

means for counting the tracks moved by the spot of the light beam; and means for disabling the counting of tracks for an interval at the start of each track access operation to make false indicators of a track count that may occur at said start of each track access operation.

2. An apparatus as set forth in claim 1, wherein said command means produces an access start command (S14) commanding start of the access; and said disabling means disables the counting for said interval after receipt of said access start command.

3. An apparatus as set forth in claim 1, wherein said counting means comprises a tracking sensor for detecting the light reflected from the optical disk; and a track counting circuit responsive to the output of the tracking sensor for counting the tracks moved by the light beam.

4. An apparatus as set forth in claim 3 wherein the tracking sensor comprises a pair of photosensitive elements, the apparatus further comprises difference detecting means for detecting the difference between the outputs of the photosensitive elements, and the track counting circuit comprises a pulse signal generating circuit for converting the output from the difference detecting means to a pulse signal;

an exclusive logical OR gate for generating the exclusive logical OR of this pulse signal and a direction input indicating the direction of track access;

a masking pulse generating circuit for generating a masking pulse to disable track counting during said interval;

a logical OR gate for performing a logical OR operation on the outputs of the exclusive logical OR gate and the masking pulse generating circuit; and a counter for counting the outputs of the logical OR gate.

5. An apparatus as set forth in claim 1 wherein said interval is longer than the time required for the spot of the light bean to move, at minimum acceleration, beyond the center of the starting track from any point where the spot of the light beam may exist in track following operation.

6. An apparatus as set forth in claim 5, wherein said interval is shorter than the time required for the spot of the light beam to move halfway from the starting track to the next track at maximum acceleration.

7. An apparatus as set forth in claim 1 wherein said interval is shorter than the time required for the spot of the light beam to move halfway from the starting tract to the next track at maximum acceleration.

8. The apparatus of claim 1, wherein said interval for which the counting of tracks is disabled is preset.

9. An optical disk drive apparatus for driving an optical disk having tracks for recording information, comprising:

an optical head for focusing a light beam onto a spot on a track on the optical disk;

an actuator for moving the optical head, thereby causing the spot of the light beam to move from its current track to a target track in order to access the target track;

command means providing information of the number of tracks to be moved for the access to a target track;

means for counting the tracks moved by the spot of the light beam comprising a tracking sensor for detecting the light reflected from the optical disk and a track counting circuit responsive to the output of the tracking sensor for counting the tracks moved by the light beam;

means for disabling the counting of tracks for an interval at the start of each track access operation;

the tracking sensor comprising a pair of photosensitive elements;

and further comprising difference detecting means for detecting the difference between the outputs of the photosensitive elements; and wherein the track counting circuit comprises:

a pulse signal generating circuit for converting the output from the difference detecting means to a pulse signal;

an exclusive logical OR gate for generating the exclusive logical OR of said pulse signal and a direction input indicating the direction of track access;

a masking pulse generating circuit for generating a masking pulse to disable track counting during said interval;

a logical OR gate for performing a logical OR operation on the outputs of the exclusive logical OR gate and the masking pulse generating circuit; and a counter for counting the outputs of the logical OR gate.

10. An apparatus as set forth in claim 9, wherein said interval is longer than the time required for the spot of the light beam to move, at minimum acceleration, beyond the center of the starting track from any point where the spot of the light beam may exist in track following operation.

11. An apparatus as set forth in claim 9, wherein said interval is shorter than the time required for the spot of the light beam to move halfway from the starting track to the next track at maximum acceleration.

12. The apparatus of claim 9, wherein said interval for which the counting of tracks is disabled is preset.

* * * * *